United States Patent [19]

Shimano

[11] 4,434,679
[45] Mar. 6, 1984

[54] SPEED-CHANGE OPERATING DEVICE FOR A BICYCLE

[75] Inventor: Keizo Shimano, Sakai, Japan

[73] Assignee: Shimano Industrial Company Limited, Osaka, Japan

[21] Appl. No.: 275,397

[22] Filed: Jun. 19, 1981

[30] Foreign Application Priority Data

Jun. 27, 1980 [JP] Japan .............................. 55-91242[U]

[51] Int. Cl.³ .......................... G05G 5/16; G05G 13/00
[52] U.S. Cl. .......................................... 74/491; 74/489; 74/501 R; 74/531
[58] Field of Search ................. 74/488, 489, 475, 531, 74/501 R, 491

[56] References Cited

U.S. PATENT DOCUMENTS 3,426,614  2/1969  Brilando et al. .................. 74/501 R
3,776,061 12/1973  Yoshigai ............................ 74/489 X
4,046,025  9/1977  Ozaki ................................ 74/501 R
4,244,235  1/1981  Yoshikawa ........................... 74/489
4,304,145 12/1981  Shimano ........................... 74/489 X

FOREIGN PATENT DOCUMENTS 2280540  2/1976  France .
2345340 10/1977  France .
2428564 11/1980  France .
 996865  2/1963  United Kingdom .

Primary Examiner—Allan D. Herrmann
Attorney, Agent, or Firm—Stevens, Davis, Miller & Mosher

[57] ABSTRACT

A speed-change operating device mounted directly on a frame of a bicycle, in which a screw thread only is provided at a direct-mounting bed fixed to the bicycle frame by a fixing means, such as welding, and a control lever is assembled in a lever shaft to form a lever unit, so that the lever unit is mounted on the frame by screwing a screw member with the bed.

9 Claims, 7 Drawing Figures

SPEED-CHANGE OPERATING DEVICE FOR A BICYCLE

FIELD OF THE INVENTION

This invention relates to a speed-change operating device directly mounted on a bicycle frame, and more particularly to a speed-change operating device for a bicycle, which incorporates a control lever with a bed welded to the bicycle frame.

BACKGROUND OF THE INVENTION

Conventionally, a speed-change operating device of a direct-mounting type is well-known which incorporates a control lever with a direct-mounting bed welded on the bicycle frame, e.g., a top tube or down tube.

Such a speed-change operating device previously mounts a lever shaft integrally on the direct-mounting bed. A control lever is thereafter assembled on the lever shaft to form the speed-change operating device at a site of a maker, assembler or dealer.

The lever is assembled by the use of parts, such as a washer, dished spring, and mounting screw. The parts and lever are separate from each other prior to assembly, causing difficulty in the supervision and assembly of the parts.

SUMMARY OF THE INVENTION

An object of the invention is to provide a speed-change operating device of a direct-mounting type in which the parts are easy to handle prior to an assembly in a direct-mounting bed and which is easy to assemble.

This has been designed to separate a lever shaft from the bed fixed to the bicycle frame, the bed being provided with a screw thread only. A control lever, washer and dished spring, are assembled in the lever shaft to form a lever unit, and the lever unit is screwed with the bed to be mounted on the bicycle frame.

In detail, the speed-change operating device of the invention has a bed fixed by welding or the like directly to the bicycle frame, the lever unit, and a screw member for mounting the lever unit on the frame in cooperation with the bed, the bed having only the screw thread screwable with the screw member, the lever unit having the lever shaft and control lever having a boss, the lever shaft having a through bore through which the screw member is allowed to screw with the bed and a holding means for holding the control lever in position at the lever shaft, the holding means assembling the lever in the lever shaft and including a restraining means for contacting with one side of the boss of the lever to restrain axial movement thereof and a biasing means for biasing the lever against the restraining means with a given friction, so that the screw member screws with the bed to mount the lever unit on the bicycle frame.

This invention, as abovementioned, forms the lever unit of the control lever assembled by the holding means in the lever shaft separate from the bed, so that, prior to attachment to the bed, the control level, friction member, such as a dished spring which provides the lever with the predetermined friction, washer, and biasing means comprising a mounting screw for mounting the lever on the lever shaft, are collected into one part therearound, thus simplifying parts handling. Furthermore, the bed is simple in construction having only the screw thread resulting in an easy attachment to the frame. Also, only one screw member is screwed with the bed to mount the lever thereon, whereby those even inexperienced can carry out an easy and quick assembly of the speed-change operating device of the invention.

These and other objects of the invention will become more apparent in the detailed description and examples which follow.

DETAILED DESCRIPTION OF THE INVENTION

A speed-change operating device of the invention comprises a bed 1 secured directly to a bicycle frame F, e.g., a down tube, by a fixing means, such as welding or the like, a lever unit 2, and a screw member 3 for mounting the lever unit 2 on bicycle frame F in cooperation with bed 1.

Figure 3:
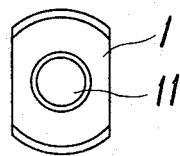
FIG. 3 is a plan view of a direct-mounting bed only.

The bed 1, as shown in FIG. 3, in not-round in cross section, has at the center only one threaded bore 11 extending perpendicularly to the axis of frame F, and is curved at the lower surface in a circular arc along the outer periphery of frame F.

The lever unit 2 comprises a control lever 22 and a lever shaft 21 having an axis perpendicular to that of threaded bore 11 at bed 1, the control lever 22 being incorporated in lever shaft 21 by a mounting screw member 25 through a dished spring 23 and washer 24. The lever unit 2 shown in FIGS. 1 through 5 uses a box-shaped mounting member 4 press-contacting with frame F by screwing the screw member 3 with bed 1, and the lever shaft 21 perforates through mounting member 4 and supports at both axial ends a pair of control levers 22.

Figure 5:
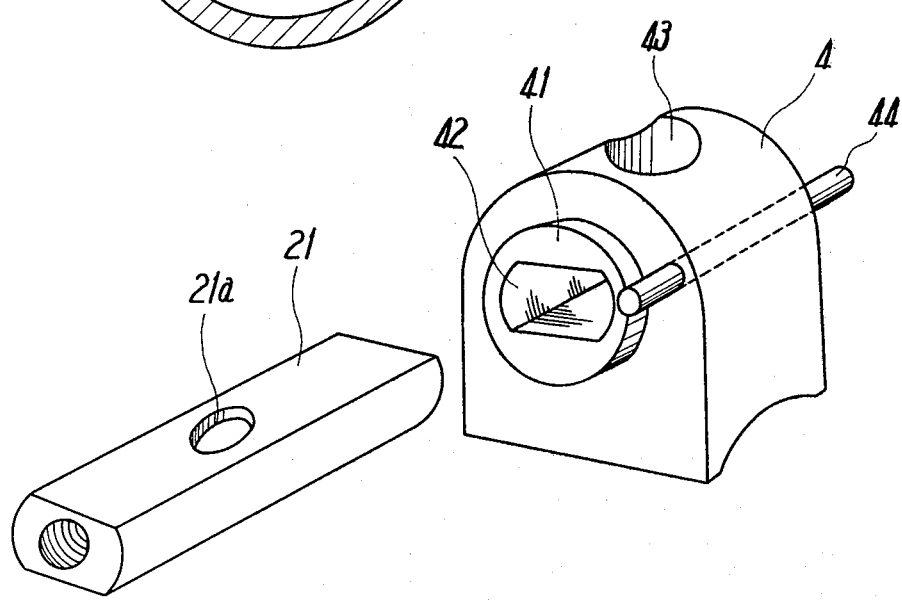
FIG. 5 is a perspective view of a lever shaft and a mounting member.

The mounting member 4, as shown in FIG. 5, is provided at the outer surface of opposite side walls with seats 41 integral therewith and abutting against the bosses of levers 22 respectively, at the center of each set 41 with an insertion bore 42 for lever shaft 21, and at the center between the side walls with a through bore 43 at a right angle with the bore 42. Also, front and rear walls connecting the side walls are curved at the lower surfaces in circular arc along the outer periphery of frame F.

The dished springs 23, washers 24, screw members 25 and seats 41 in the aforesaid construction constitute a holding means for keeping the control levers in position with respect to lever shaft 21.

In other words, each seat 41 abuts against one side of the boss of lever 22 to restrain an axial movement thereof, thus forming a restraining means. The dished springs 23 and screw members 25 constitute biasing means which bias the levers 22 toward seats 41 with a predetermined friction.

Thus, the control levers 22 are assembled in lever shaft 21 through the holding means to be formed into one complete lever unit.

In addition, the dished springs 23 each give to rotation of lever 22 friction against a return spring at a derailleur (not shown), which may alternatively be other friction members, or use a positioning mechanism comprising recesses and an engaging body, such as a ball or the like.

Figure 2:
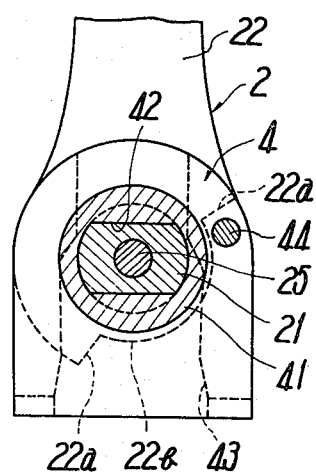
FIG. 2 is a sectional view taken on the line II—II in FIG. 1.

The lever shaft 21 and insertion bore 42 at mounting member 4, as shown in FIGS. 2 and 5, have two opposite flat faces respectively, the lever shaft 21 being mounted not-rotatably with respect to mounting member 4, projecting at both axial ends outwardly therefrom, and having at the center of an axial length a mounting bore 21a having an axis perpendicular to the axis of lever shaft 21 and coincident with that of threaded bore 11 at bed 1.

Figure 1:
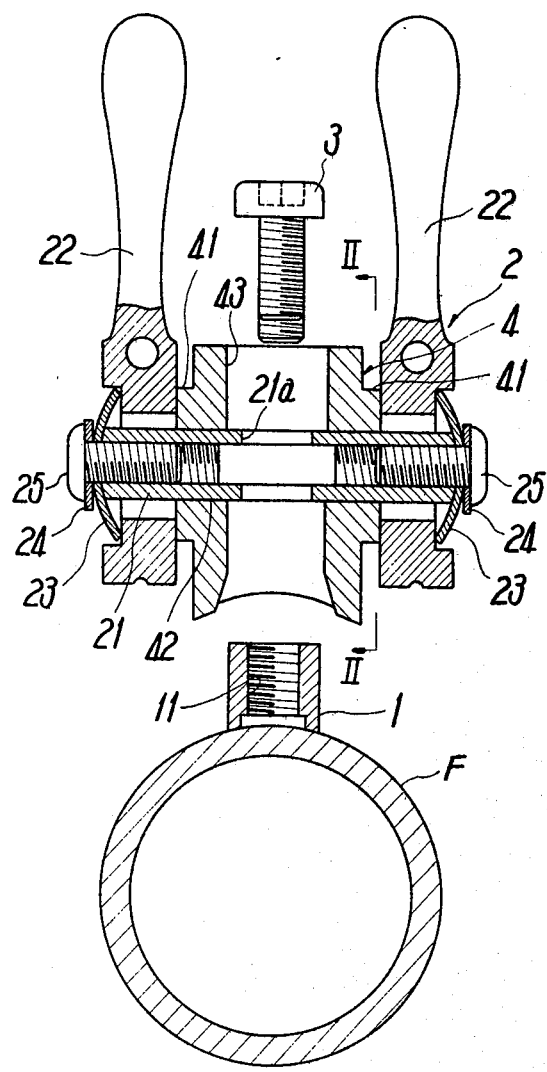
FIG. 1 is a sectional view of an embodiment of a speed-change operating device of the invention, prior to its assembly.

The lever shaft 21, control levers 22, and mounting member 4, are utilized as shown in FIG. 1 to form the lever unit 2, so that these members and dished springs 23, washers 24, and mounting screw members 25 are not separated from each other prior to the attachment to bed 1, thereby simplifying handling of these parts.

Furthermore, the aforesaid unitized lever unit 2 is simply mountable on frame F only by inserting the mounting screw member 3 into bore 21a and screwing it with threaded bore 11 at bed 1.

Figure 4:
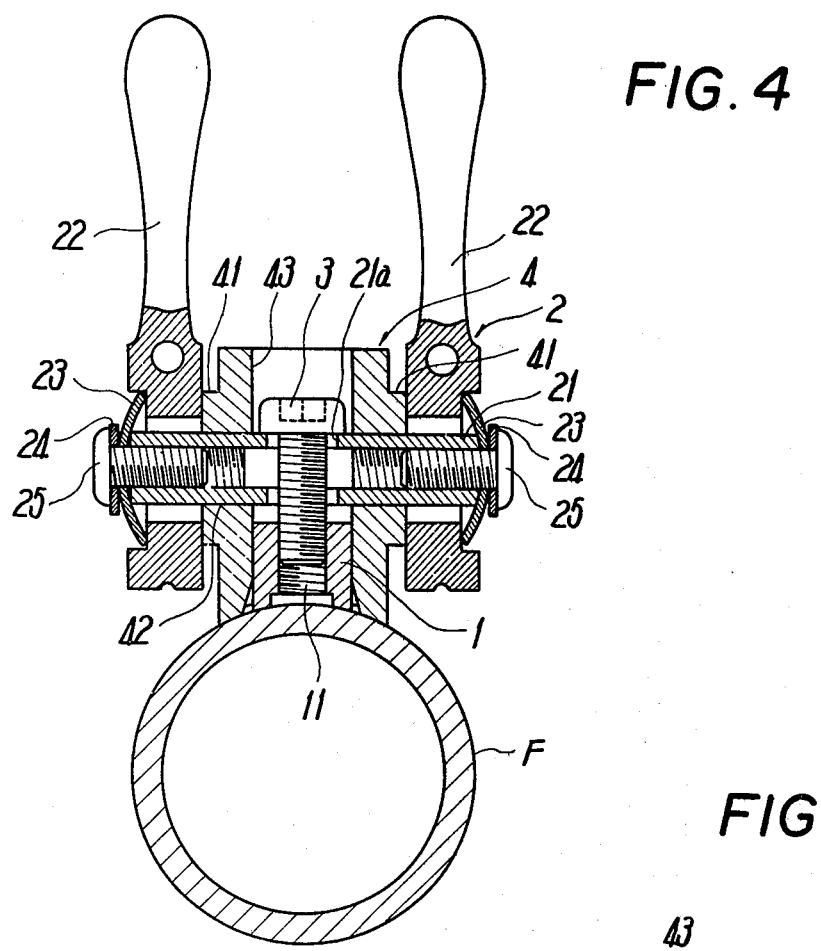
FIG. 4 is a sectional view of the FIG. 1 embodiment after its assembly.

In the aforesaid embodiment, the mounting member 4, as shown in FIG. 4, is in close contact with the outer surface of frame F after the screw member 3 screws with threaded bore 11, thereby rigidly mounting the lever unit on frame F.

Also, the mounting member 4, which has the seats 41, needs no washer between the same and the levers 22. The lever shaft 21, when the mounting member 4 is box-shaped, can be formed of a drawn material or pipe as shown in FIG. 5, thereby being inexpensive to produce.

The mounting member 4, as shown in FIG. 2 and 5, is provided with pins 44 projecting from the side walls of the same, so that each pin 44 restricts a range of rotation of each lever 22. The pins 44 may be integral with mounting member 4, but it is preferable that the pins 44 are formed of one member separate from mounting member 4, which is larger in length than between the outer surface of the side walls and has at an intermediate portion a radially outwardly swollen portion, so that the pin 44 of one member perforates through the mounting member 4 and is press-fitted therein through the swollen portion.

In this instance, the boss of each lever 22, as shown by the dotted line in FIG. 2, is provided with a recess 22b having a pair of faces 22a engageable with each pin 44.

The through bore 43 at mounting member 4 has downwardly expanded slant portions in the vicinity of the lower surface and the direct-mounting bed 1 is slanted at the sides corresponding to the slant portions of bore 43, so that a wedge effect can further rigidly fix the mounting member 4 to bed 1.

Figure 6:
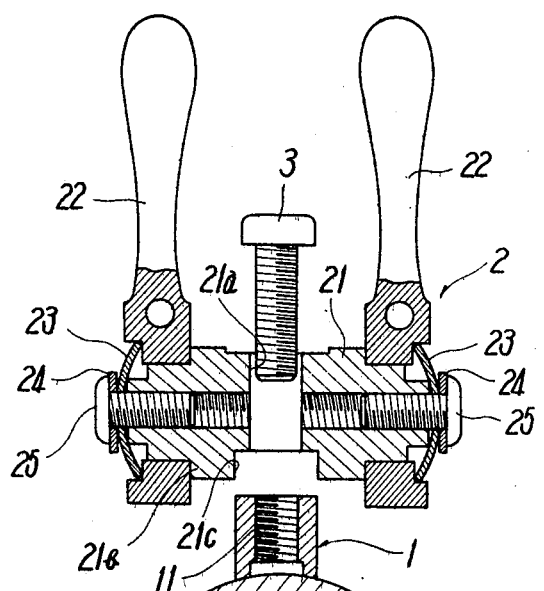
FIG. 6 is a sectional view of a modified embodiment of the invention, prior to its assembly.

Alternatively, the lever unit 2, as shown in FIG. 6, may not use the mounting member 4, in which case the lever shaft 21 has stepped portions 21b for restraining the control levers 22 from axially moving respectively, and is provided at the center of an axial length with a mounting bore 21a similar to the aforesaid embodiment, and below the bore 21a with a socket 21c receiving the bed 1.

Figure 7:
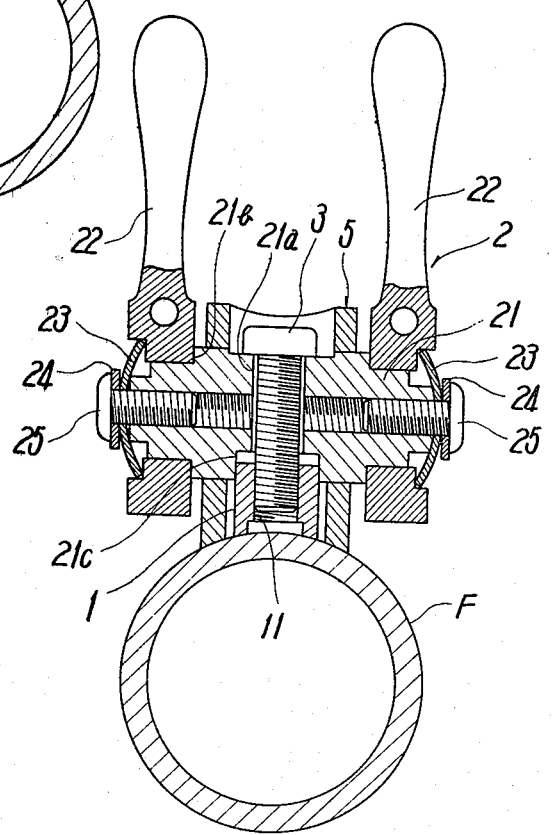
FIG. 7 is a sectional view of another modified embodiment of the invention after its assembly.

Also, the embodiment in FIG. 6 may, as shown in FIG. 7, use a mounting member 5 the same as the mounting member 4 shown in FIGS. 1 through 5. In this instance, the mounting member 5 need not have the seats 41 because the levers 22 are received by stepped portions 21b at lever shaft 21, thereby being able to be formed of a pipe member.

As seen from the above, all the embodiments mount the lever unit constructed as abovementioned, on the direct-mounting bed 1, so that the utilized control levers 22, lever shaft 21, dished springs 23, washers 24, and screw members 25, are not kept separate prior to the mounting on the bed 1, resulting in simple handling of these parts.

Furthermore, the mounting of lever unit on the bed 1 only by screwing the screw member 3 therewith, is readily and quickly performed, even by those who are inexperienced.

In addition, the bed 1 may alternatively be provided at the outer periphery with a screw thread and the screw member 3 may be substituted by a nut.

Although several embodiments have been described, they are merely exemplary of the invention and not to be construed as limiting, the invention being defined solely by the appended claims.

What is claimed is:

1. A speed-change operating device mounted directly on a frame of a bicycle comprising a bed fixed directly to said frame by a fixing means, a lever unit, and a screw member for mounting said lever unit on said frame in cooperation with said bed, said bed having only a screw thread screwable with said screw member, said lever unit comprising a lever shaft, a control lever having a boss, and a holding means for holding said control lever in position at said lever shaft, said holding means assembling said control lever on said lever shaft and including a restraining means contacting with the lateral surface of said boss at said control lever and restraining said control lever from axially moving and a biasing means for biasing said control lever to said restraining means with a given frictional force, said screw member being screwable with said bed to mount said lever unit on said frame.

2. A speed-change operating device for a bicycle according to claim 1, wherein said lever shaft includes a mounting member which press-contacts with the bicycle frame by screwing said screw member with said bed, said mounting member having a through bore through which said screw member is allowed to screw with said bed.

3. A speed-change operating device for a bicycle according to claim 2, wherein said lever shaft comprises a pipe, said mounting member comprising a box-shaped member having a through bore, said lever shaft being mounted not-rotatably on said mounting member so as to project at one axial end partially outwardly from said mounting member, so that said control lever is assembled in said projecting portion of said lever shaft from said mounting member.

4. A speed-change operating device for a bicycle according to claim 3, wherein said mounting member is provided integrally with a seat abutting against the boss of said control lever.

5. A speed-change operating device for a bicycle according to claim 2, wherein said mounting member comprises a pipe, said lever shaft having a restraining stepped portion for restraining said control lever from axially moving.

6. A speed-change operating device for a bicycle according to claim 1, wherein said lever shaft has a restraining stepped portion for restraining said control lever from axially moving.

7. A speed-change operating device for a bicycle according to claim 1, wherein said lever unit has a pair of control levers and a pair of holding means for holding said pair of control levers at both axial ends of one lever shaft, each of said holding means assembling each of said levers in said lever shaft.

8. A speed-change operating device for a bicycle according to claim 1, wherein said bed has a non-circular cross-sectional shape and said screw thread at said bed extends substantially perpendicularly to a longitudinal axis of said frame, said lever unit having a mounting bore through which said screw member passes to engage with said screw thread and a non-circular receiving portion engageable with the non-circular shape of said bed to prevent rotation of said lever unit relative to said frame.

9. A speed-change operating device for a bicycle according to claim 1 wherein said lever shaft has a through bore through which said screw member passes to screw with said screw thread at said bed.

* * * * *